Sept. 9, 1924.
C. F. JANSEN
VALVE
Filed March 26, 1924
1,508,056
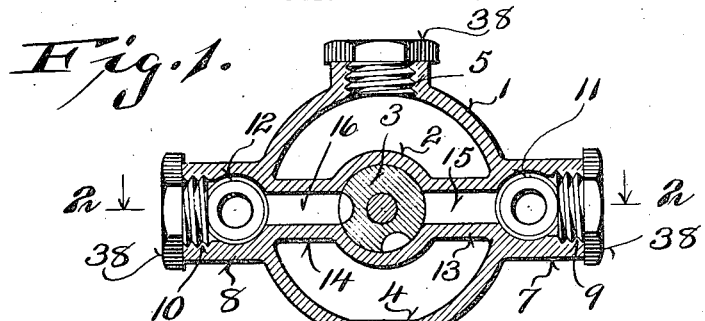
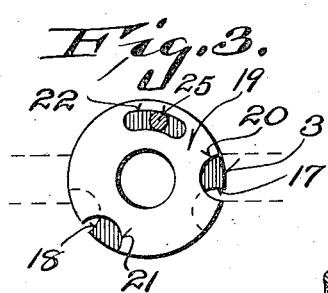
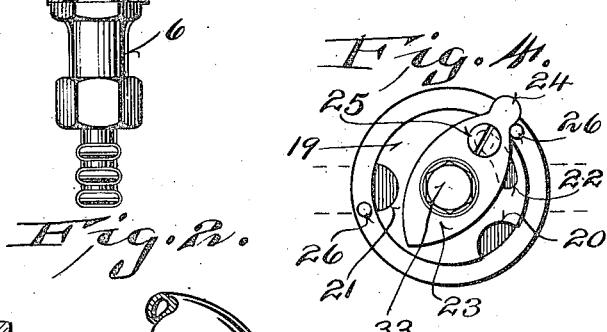
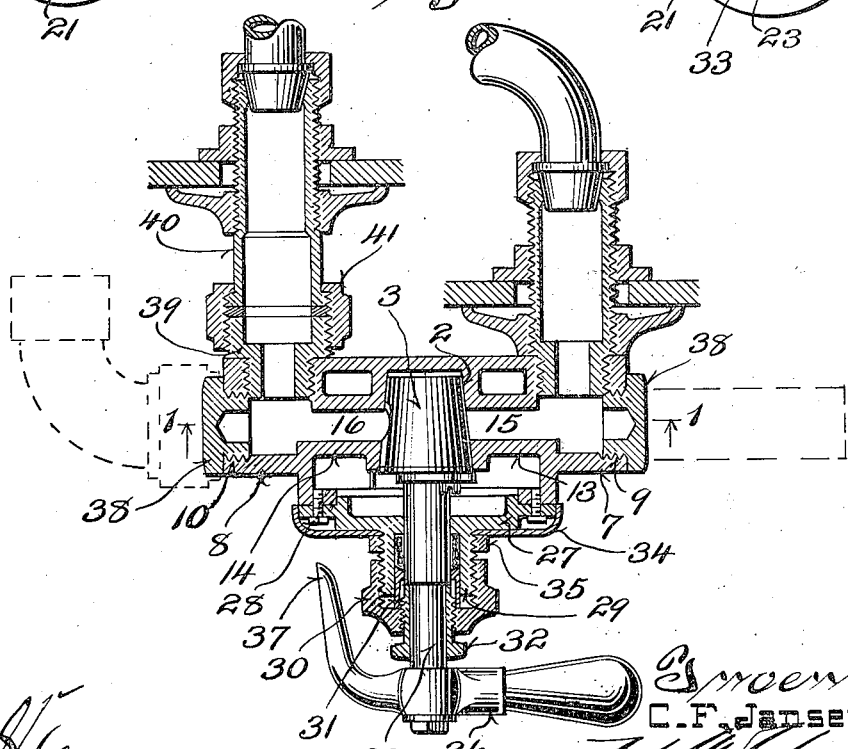

Patented Sept. 9, 1924.

1,508,056

UNITED STATES PATENT OFFICE.

CHARLES F. JANSEN, OF MILWAUKEE, WISCONSIN.

VALVE.

Application filed March 26, 1924. Serial No. 701,965.

*To all whom it may concern:*

Be it known that I, CHARLES F. JANSEN, a citizen of the United States, and resident of Milwaukee, in the county of Milwaukee and State of Wisconsin, have invented certain new and useful Improvements in Valves; and I do hereby declare that the following is a full, clear, and exact description thereof.

This invention relates to valves, and is particularly directed to a mixing valve.

In applying valves of the double or mixing type to bath tub fittings, shower bath fittings and other places of a similar nature, difficulty has been encountered due to the variation in the relative position or shape and size of the pipes or inlets to which the valve must necessarily be attached. Consequently it has been frequently necessary to carry a large number of widely different valves on each job, so that the exact valve required may be fitted. In addition to this, the inlets and outlets of the standard valves may not always extend in the right direction, and consequently a further inconvenience in positioning these valves results.

In addition to this, the mixing valves do not permit an adjustment of the total flow but merely of the relative proportions of hot and cold water. Thus it frequently happens that a valve suitable for one use is wholly unsuitable for another use in which a lesser or a greater total flow is required.

This invention is designed to overcome the above noted defects, and objects of such invention are, therefore, to provide a mixing valve which is so constructed that extreme flexibility in attachment is attained, and which is so formed that the inlets and outlets may be reversed or may extend at any one of several angles to the main body of the valve, and it is intended to provide these valves with attachments which are adapted to any size or type of pipe in addition to the previously outlined flexibility of the attachment.

Further objects are to provide a mixing valve which may be initially adjusted for the particular work intended so that the total flow may be accurately gauged and maintained under all conditions, thus adapting the valve to the exact needs of the particular work and avoiding the necessity of providing an additional flow controlling valve or other devices of this nature.

An embodiment of the invention is shown in the accompanying drawings, in which:

Figure 1 is a transverse sectional view through the valve, such view corresponding to a section on the line 1—1 of Figure 2.

Figure 2 is a longitudinal section through the valve such view corresponding to a section on the line 2—2 of Figure 1.

Figure 3 is an enlarged end view of the valve proper, with the stop removed.

Figure 4 is an end view of the valve proper, and the associated valve seat showing the stop in position.

The valve comprises a main casing 1 which is provided with a central conical valve seat 2 adapted to receive the conical valve 3. This main casing is open throughout its interior and is provided with a pair of threaded apertures 4 and 5, either one of which is adapted to receive the discharge fitting 6. The casing is further provided with a pair of bosses or projections 7 and 8 which are equipped with outwardly extending threaded apertures 9 and 10. These bosses are further provided with threaded apertures 11 and 12 which extend outwardly towards the back of the valve and at right angles to the axis of the apertures 9 and 10. These threaded apertures constitute the inlet portions of the device and are joined to the central valve seat cavity by means of transverse tubular members 13 and 14 provided with ducts 15 and 16. The members 13 and 14 are integrally formed with the other portions of the valve casing and do not extend completely across the casing from the bottom to the top, but permit free communication of all portions of the interior of the casing except the ducts 15 and 16.

The valve proper 3 is, as stated, of conical contour and is provided with marginal slots 17 and 18 adapted to control the ducts 15 and 16 and to place the ducts in communication with the interior of the casing 1 under certain conditions, and under varying proportions, or else to cut off communication between such ducts and the interior of the casing under other conditions. A plate 19, in the form of a disk provided with notches 20 and 21, and with an arcuate slot 22, is mounted upon the outer face of the valve 3. A stop 23 provided with an outwardly projecting lug 24 is mounted outside of the disk 19, as shown in Figures 2 and 4. A screw 25 is passed through the stop 23, through the slot 22 and is screwed into the body of the valve 3, thus when it is desired to adjust the amount of total flow, the screw 25 is loosened and the adjusting disk 19 is turned to constrict the ducts or slots 17 and 18 to the desired extent, as shown in Figure 3. Thereafter, the screw is tightened. Thus locking the parts in position. It is to be noted that pins 26 are provided which contact with the lug 24 of the stop to limit the extreme motion of the valve.

The outer face of the valve is closed by means of a disk 27 held in place by screws 28, as shown in Figure 2, and provided with a stuffing box 29 externally threaded for the reception of the nut 30, and adapted to receive packing, and a slidable gland 31 in the usual manner. A second nut 32 is threaded to the nut 30 and abuts a shoulder formed on the valve stem 33 to maintain the valve 3 in its correct position within the valve seat or socket. A finishing cover plate 34 is apertured to receive the stuffing box 29, and is flanged so as to fit over the edge of the disk 27 to provide a finished appearance. It is provided with legends indicating "Off" "Cold" "Warm" and "Hot" or similar devices, and is held in place by a lock nut 35. The end of the spindle is square to receive the manipulating handle 36. This handle is provided with a pointer 37 adapted to cooperate with the legend bearing plate or cover 34 to indicate the setting of the valve.

The valve is furnished with a plurality of plugs 38 which are screwed into the unused apertures, for instance, those indicated at 9, 5 and 10, and these plugs are nickel plated or otherwise finished to conform to the finish of the remaining portions of the valve.

When the valve is to be used in connection with pipes entering from the rear, the parts are assembled, as shown in Figure 2, and reduction fittings 39 may be employed to adapt the valve to any desired length or size of connector 40, a suitable union 41 being provided, if desired. As shown in the drawings, any usual type of pipe or fitting may readily cooperate with the valve by providing the necessary fitting 39 and, obviously, these fittings may be furnished as a part of the valve equipment.

In addition to this, when it is desired to position the valve in the reverse manner from that described. Obviously, the uppermost plug 38 (see Figure 1) may be interchanged with the outlet fitting 6 and the valve reversed.

Further, if the inlet pipes enter from the sides of the valve, as shown in dotted lines in Figure 2, the side plugs 38 may be screwed into the threaded apertures 11 and 12 and the pipes may be connected with the threaded apertures 9 and 10.

It will thus be seen that a mixing valve has been provided which has the maximum of flexibility of attachment so that it may be adapted to any type of supply pipes however they may be located or whatever standard size they may be.

It will further be seen that a mixing valve has been provided which may be initially set to the exact desired total flow for the particular work intended.

It will further be seen that this extreme flexibility is not secured at an expense to the appearance or finish of the valve but that a valve has been provided which is of attractive appearance, of ornamental design, and which is highly serviceable in operation.

It will further be seen that a valve has been provided in which there are no springs and no cams, thus producing a cheap, lasting valve, as there are few moving parts and practically nothing to break or wear out under continued use.

Although the invention has been described in considerable detail, it is to be understood that the invention may be variously embodied and is, therefore, to be limited only as claimed.

I claim:

1. A mixing valve comprising a main casing having a hollow interior and having a pair of inlet openings and an outlet opening, tubular members carried within said casing and extending inwardly from said inlet openings, a central valve socket seat communicating with said tubular members, a valve seated within said socket and controlling communication of said tubular members with the interior of said casing, and means carried directly by said valve for controlling the total flow irrespective of the seating of said valve.

2. A mixing valve comprising a main casing having a hollow interior and having a pair of inlet openings, and an outlet opening, tubular members carried within said casing and extending inwardly from said inlet openings, a central valve socket seat communicating with said tubular members, a valve seated within said socket and controlling communication of said tubular members with the interior of said casing, and a notched disk directly carried by the outer face of said valve and adapted to be set in any one of a plurality of positions to control the total flow irrespective of the seating of said valve.

3. A mixing valve comprising a main casing having a hollow interior and having a pair of inlet openings, and an outlet opening, tubular members carried within said casing and extending inwardly from said inlet openings, a central valve socket seat communicating with said tubular members, a valve seated within said socket and controlling communication of said tubular members with the interior of said casing, a notched disk directly carried by the outer face of said valve and adapted to be set in any one of a plurality of positions to control the total flow, a stop mounted outside of said disk, and a screw passing through said stop, said disk and into said valve for locking said stop valve and disk in relative adjusted position.

4. A mixing valve comprising a hollow casing having diametrically located outlet openings and diametrically located inlet openings, valve mechanism carried within said casing to control the communication of said inlet openings with the interior of said casing, and a plug and outlet fitting screwed into said outlet openings.

5. A mixing valve comprising a hollow casing having an outlet opening, valve mechanism located within said casing, said casing having diametrically opposed pairs of inlet openings with the members of each pair arranged at right angles to each other, any of said inlet openings being adapted to receive supply pipe fittings, and plugs screwed into the unused inlet openings, whereby the valve may be used in any one of a plurality of positions.

6. A mixing valve comprising a hollow casing, valve mechanism carried within said casing, said casing having diametrically opposed outlet openings, a plug screwed into one of said outlet openings, and a delivery fitting screwed into the other of said outlet openings, said casing having diametrically opposed pairs of inlet openings, the individual members of each pair being arranged at right angles to each other, any of said inlet openings being adapted to receive supply pipe fittings, and plugs closing the unused inlet openings, whereby said valve may cooperate with any arrangement of supply pipe fittings, and whereby said first mentioned plug and seat outlet fitting may be interchanged.

In testimony that I claim the foregoing I have hereunto set my hand at Milwaukee, in the county of Milwaukee and State of Wisconsin.

CHARLES F. JANSEN.